(12) United States Patent
Kansara et al.

(10) Patent No.: US 11,700,404 B2
(45) Date of Patent: Jul. 11, 2023

(54) AUTOMATED VIDEO CROPPING

(71) Applicant: Netflix, Inc., Los Gatos, CA (US)

(72) Inventors: Apurvakumar Dilipkumar Kansara, San Jose, CA (US); Sanford Holsapple, Sherman Oaks, CA (US); Arica Westadt, Los Angeles, CA (US); Kunal Bisla, Pleasanton, CA (US); Sameer Shah, Fremont, CA (US)

(73) Assignee: Netflix Inc., Los Gatos, CA (US)

( * ) Notice: Subject to any disclaimer, the term of this patent is extended or adjusted under 35 U.S.C. 154(b) by 0 days.

(21) Appl. No.: 18/045,790

(22) Filed: Oct. 11, 2022

(65) Prior Publication Data
US 2023/0059805 A1      Feb. 23, 2023

Related U.S. Application Data

(63) Continuation of application No. 17/063,445, filed on Oct. 5, 2020, now Pat. No. 11,477,533, which is a
(Continued)

(51) Int. Cl.
*H04N 21/4728* (2011.01)
*H04N 21/431* (2011.01)
(Continued)

(52) U.S. Cl.
CPC ......... *H04N 21/4728* (2013.01); *G06V 20/46* (2022.01); *G06V 20/49* (2022.01); *H04N 21/4318* (2013.01); *H04N 21/440272* (2013.01); *H04N 21/4854* (2013.01); *H04N 21/4858* (2013.01)

(58) Field of Classification Search
CPC ... H04N 21/234318; H04N 21/234327; H04N 21/252; H04N 21/25866; H04N 21/2743; H04N 21/41407; H04N 21/4143; H04N 21/4223; H04N 21/44008; H04N 21/44204; H04N 21/4725; H04N 21/4758; H04N 21/4784; H04N 21/631; H04N 21/8133; H04N 5/33; H04N 5/772
See application file for complete search history.

(56) References Cited

U.S. PATENT DOCUMENTS

| | | | |
|---|---|---|---|
| 10,635,844 B1* | 4/2020 | Roose | G06F 30/20 |
| 2019/0116273 A1* | 4/2019 | Takeuchi | H04N 1/00461 |
| 2019/0130165 A1* | 5/2019 | Seshadri | G06V 40/172 |

* cited by examiner

*Primary Examiner* — Samira Monshi
(74) *Attorney, Agent, or Firm* — Greenberg Traurig, LLP

(57) ABSTRACT

The disclosed computer-implemented method may include receiving, as an input, segmented video scenes, where each video scene includes a specified length of video content. The method may further include scanning the video scenes to identify objects within the video scene and also determining a relative importance value for the identified objects. The relative importance value may include an indication of which objects are to be included in a cropped version of the video scene. The method may also include generating a video crop that is to be applied to the video scene such that the resulting cropped version of the video scene includes those identified objects that are to be included based on the relative importance value. The method may also include applying the generated video crop to the video scene to produce the cropped version of the video scene. Various other methods, systems, and computer-readable media are also disclosed.

20 Claims, 10 Drawing Sheets

Related U.S. Application Data continuation of application No. 16/457,586, filed on Jun. 28, 2019, now Pat. No. 10,834,465.

(51) Int. Cl.
*H04N 21/4402* (2011.01)
*H04N 21/485* (2011.01)
*G06V 20/40* (2022.01)

AUTOMATED VIDEO CROPPING

CROSS REFERENCE TO RELATED APPLICATION

This application is a continuation of U.S. patent application Ser. No. 17/063,445, filed Oct. 5, 2020, which is a continuation of U.S. patent application Ser. No. 16/457,586, filed Jun. 28, 2019, the disclosures of which are incorporated, in their entirety, by this reference.

BACKGROUND

Consumers of video content regularly use many different devices and applications to view their videos. For example, users may view some video content on their smartphones, some on their tablets, and some on their televisions. Still further, these videos may be watched within web browsers, within video streaming applications, within game consoles, or using other software applications or hardware devices. Accordingly, due to the many options for viewing video content, those videos are often subject to playback in many different aspect ratios in order for the video to fit properly within the application and/or the device. As such, these videos are often cropped and sized to fit a given screen or application. This cropping, however, is often done manually and, as a result, is time-consuming and prone to the subjective decisions of video editors performing the crop.

SUMMARY

As will be described in greater detail below, the present disclosure describes methods and systems for automatically generating and applying a video crop based on which objects in a scene the viewer is most likely to be interested in seeing.

In one example, a computer-implemented method for automatically cropping video content may include receiving, as an input, segmented video scenes, where each video scene includes a specified length of video content. The method may further include scanning the video scenes to identify objects within the video scene. The method may also include determining a relative importance value for the identified objects. The relative importance value may include an indication of which objects are to be included in a cropped version of the video scene. The method may further include generating a video crop that is to be applied to the video scene, such that the resulting cropped version of the video scene may include those identified objects that are to be included based on the relative importance value. The method may also include applying the generated video crop to the video scene to produce the cropped version of the video scene. Various other methods, systems, and computer-readable media are also disclosed.

In some examples, the generated video crop may be configured to generate multiple different aspect ratios for the cropped version of the video scene. In some examples, the generated video crop may be configured to generate different shapes for the cropped version of the video scene. In some examples, the generated crop may be specific to the size of a display screen. In some examples, determining a relative importance value for the identified objects within the video scene may include, as a determining factor, the size of the display screen.

In some examples, determining a relative importance value for one or more of the identified objects within the video scene may include determining which of the identified objects a viewer is most likely to want to see. In some examples, determining a relative importance value for the identified objects within the video scene may include determining which of the identified objects are to be included in a specific aspect ratio.

In some examples, the method may further include determining that at least two objects in the video scene have a sufficient relative importance value to be included in the resulting cropped version of the video scene, determining that the cropped version of the video scene has insufficient space to include each of the at least two objects, determining prioritization values for the at least two objects, and applying the generated video crop based on the prioritization values, such that the object with the highest prioritization value is included in the cropped version of the video scene.

In some examples, determining a relative importance value for the identified objects within the video scene may include determining a frequency of occurrence of the identified objects within the video scene. In some examples, determining a relative importance value for the identified objects within the video scene may include measuring an amount of movement of the identified objects within the video scene. In some examples, determining a relative importance value for the identified objects within the video scene may include measuring an amount of blurring associated with each of the identified objects in the video scene.

In addition, a corresponding system for automatically cropping a video scene may include at least one physical processor and physical memory comprising computer-executable instructions that, when executed by the physical processor, cause the physical processor to: receive, as an input, various segmented video scenes, where each video scene includes a specified length of video content. The physical processor may scan at least one of the video scenes to identify objects within the video scene and determine a relative importance value for the identified objects within the video scene. The relative importance value may include an indication of which of the identified objects are to be included in a cropped version of the video scene. The physical processor may also generate, based on the determination, a video crop that is to be applied to the video scene, such that the resulting cropped version of the video scene includes those identified objects that are to be included according to the relative importance value. The physical processor may further apply the generated video crop to the video scene to produce the cropped version of the video scene.

In some examples, the same generated video crop may be used to crop the video scene into multiple different shapes or sizes. In some examples, the physical processor may further determine a semantic context for at least some of the identified objects in the video scene. In some examples, the determined semantic context may be implemented when determining the relative importance value for the identified objects in the video scene. In some examples, the physical processor may track which video crops were generated and applied to the video scenes. In some examples, the physical processor may then compare at least one cropped version of the video scene to a user-cropped version of the same video scene to identify various differences in cropping. In some examples, the physical processor may automatically alter how the video crop is generated based on the identified differences in cropping. In some examples, the physical processor may further encode the cropped version of the video scene according to a specified encoding format.

In some examples, the above-described method may be encoded as computer-readable instructions on a computer-readable medium. For example, a computer-readable medium may include one or more computer-executable instructions that, when executed by at least one processor of a computing device, may cause the computing device to receive, as an input, various segmented video scenes, where each video scene includes a specified length of video content, scan at least one of the video scenes to identify objects within the video scene and determine a relative importance value for the identified objects within the video scene, where the relative importance value may include an indication of which of the identified objects are to be included in a cropped version of the video scene, generate, based on the determination, a video crop that is to be applied to the video scene, such that the resulting cropped version of the video scene includes those identified objects that are to be included according to the relative importance value, and apply the generated video crop to the video scene to produce the cropped version of the video scene.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
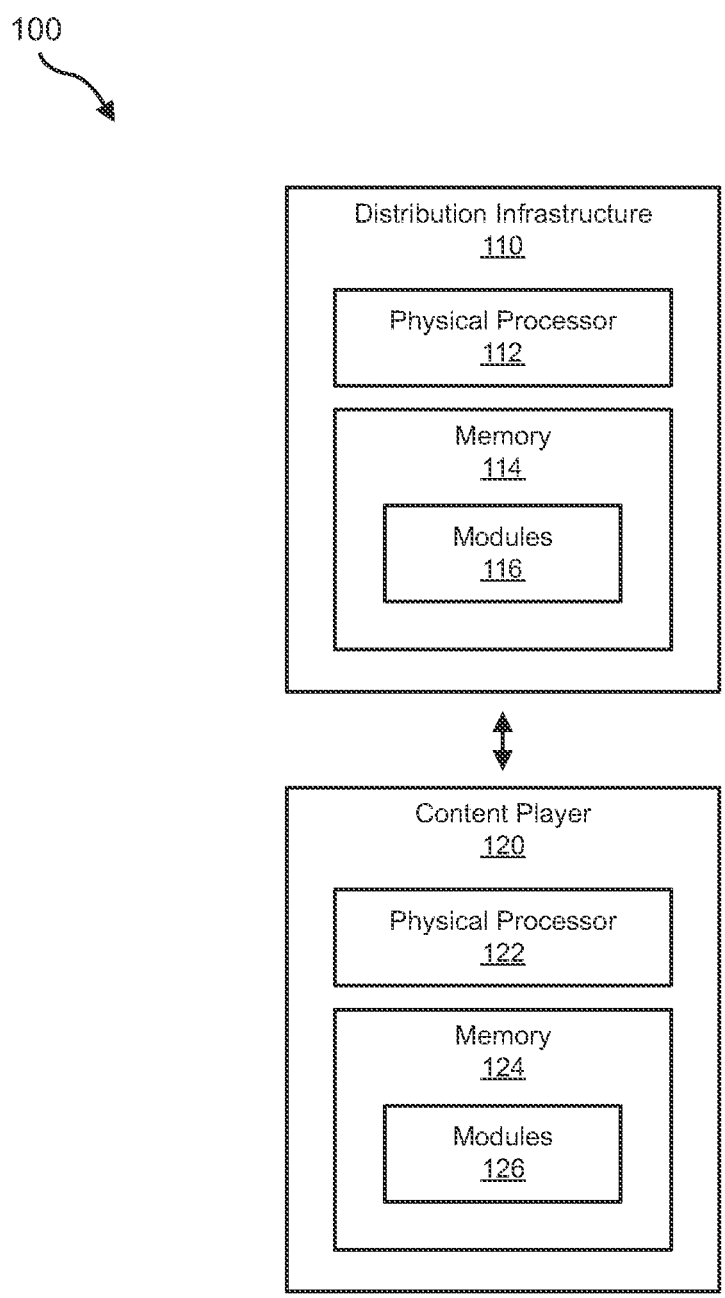
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for automatically generating and applying a video crop to a video scene. In traditional systems, video scenes are often cropped in a mechanical fashion without regard to the content in the video scenes. For example, if a film shot in a 16:9 aspect ratio was to be cropped for a 4:3 television, some content on the sides of the video would be cropped off. This cropping would occur through the duration of the film, regardless of which content was cropped out. In other traditional systems, users would manually review a video scene and crop the scene by hand. This process, however, is laborious and time-consuming and is subject to the whims of the video editor performing the crop.

In the embodiments herein, systems and methods may be provided that automatically generate a crop for a given video scene and then apply that crop to generate a cropped version of the scene. The systems described herein may take many different factors into consideration when determining how to generate a crop for a particular scene. For example, systems herein may analyze a film or portion of video content and may identify certain objects in a scene. The systems may determine whether those objects appear in other scenes in the movie or tv show or may determine whether those objects are moving or conversing with each other or may determine whether the objects are in focus or out of focus. The systems described herein may look at many different context-specific factors when generating a crop for a given scene.

During this process, the systems described herein may determine a relative importance value for a given object. For instance, the relative importance value for a main character in a film (as gauged by the character's number of appearances in the film) may be relatively high as compared to other characters in the film. Other objects in the film, such as an item needed to complete a quest, may also be given a relatively high importance value. Such characters or objects may be maintained in the cropped version of the video scene at the cost of potentially other, lower value characters or items. Thus, based on the relative importance value for each object in a scene, the generated video crop may change to ensure that those objects are included in the cropped version of the scene and are not cropped out to meet a size constraint. At least in some embodiments, those objects with the highest relative importance value are those objects in a scene that the user is most likely to want to see. This determination may change for each scene, may apply for a certain portion of a movie, or may be applied throughout the length of the film or other video content.

In some cases, self-learning neural networks may be used to identify objects in a scene and then further used to determine a relative importance value for each identified object. Over time, these self-learning neural networks may improve the algorithms used for identifying objects in a video scene, even if those objects change positions or change orientations or change costumes or change their look in some other manner. Moreover, the self-learning neural networks may improve their algorithms for determining which objects in a scene a user would want to see and would want to ensure was in the final cropped version of the video scene. In some cases, the self-learning neural networks may have access to user-cropped versions (i.e., manually cropped versions) of a film and may compare the neural network-cropped version to the user-cropped version and may use the comparison as feedback to improve its algorithms. Other user feedback indicating a particularly good crop or a particularly bad crop for a given scene may also be used to benchmark the system and improve its outputs. These and other embodiments will be described further below with regard to FIGS. 1-10.

Figure 2:
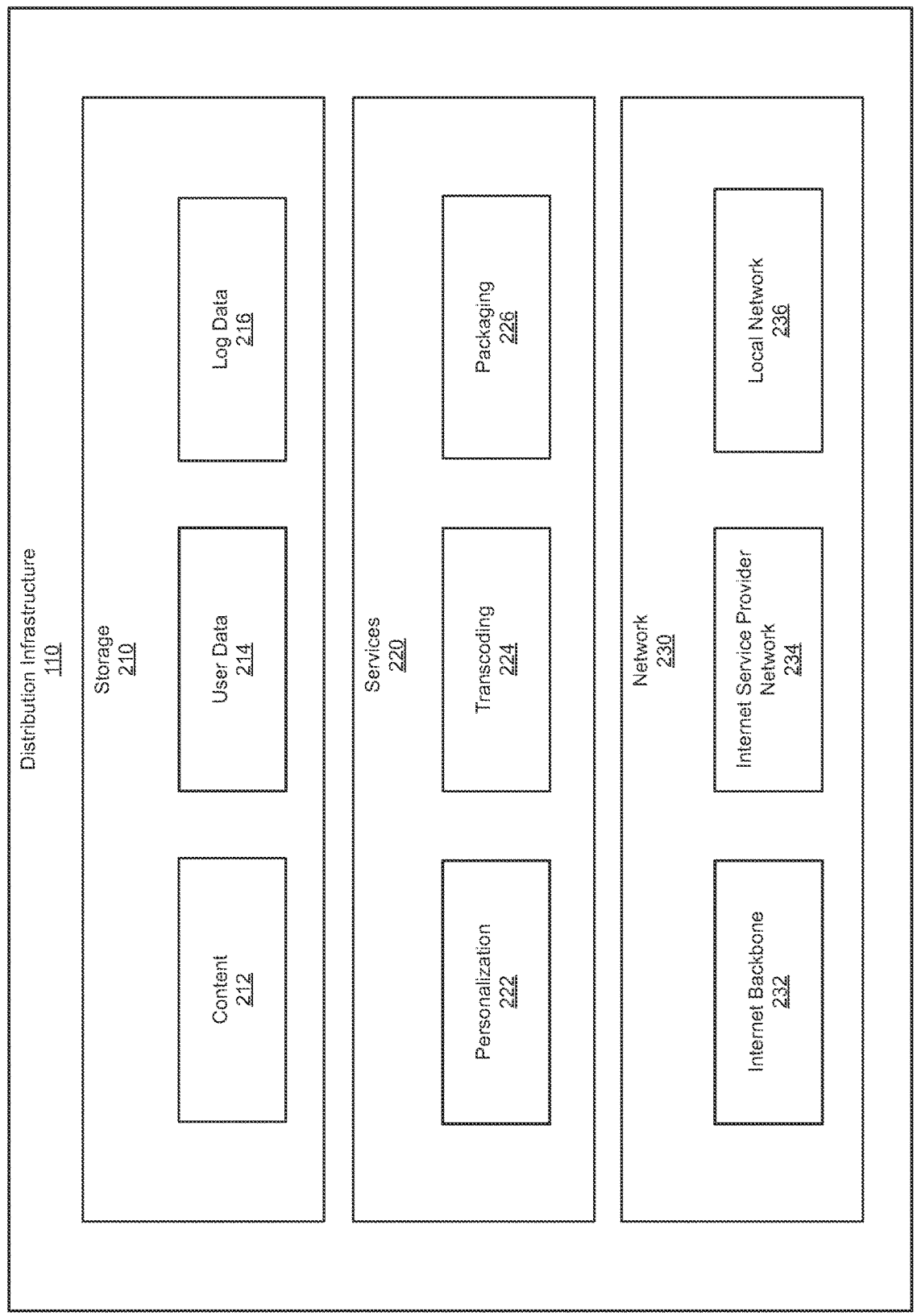
FIG. 2 is a block diagram of an exemplary distribution infrastructure within the content distribution ecosystem shown in FIG. 1.
Figure 3:
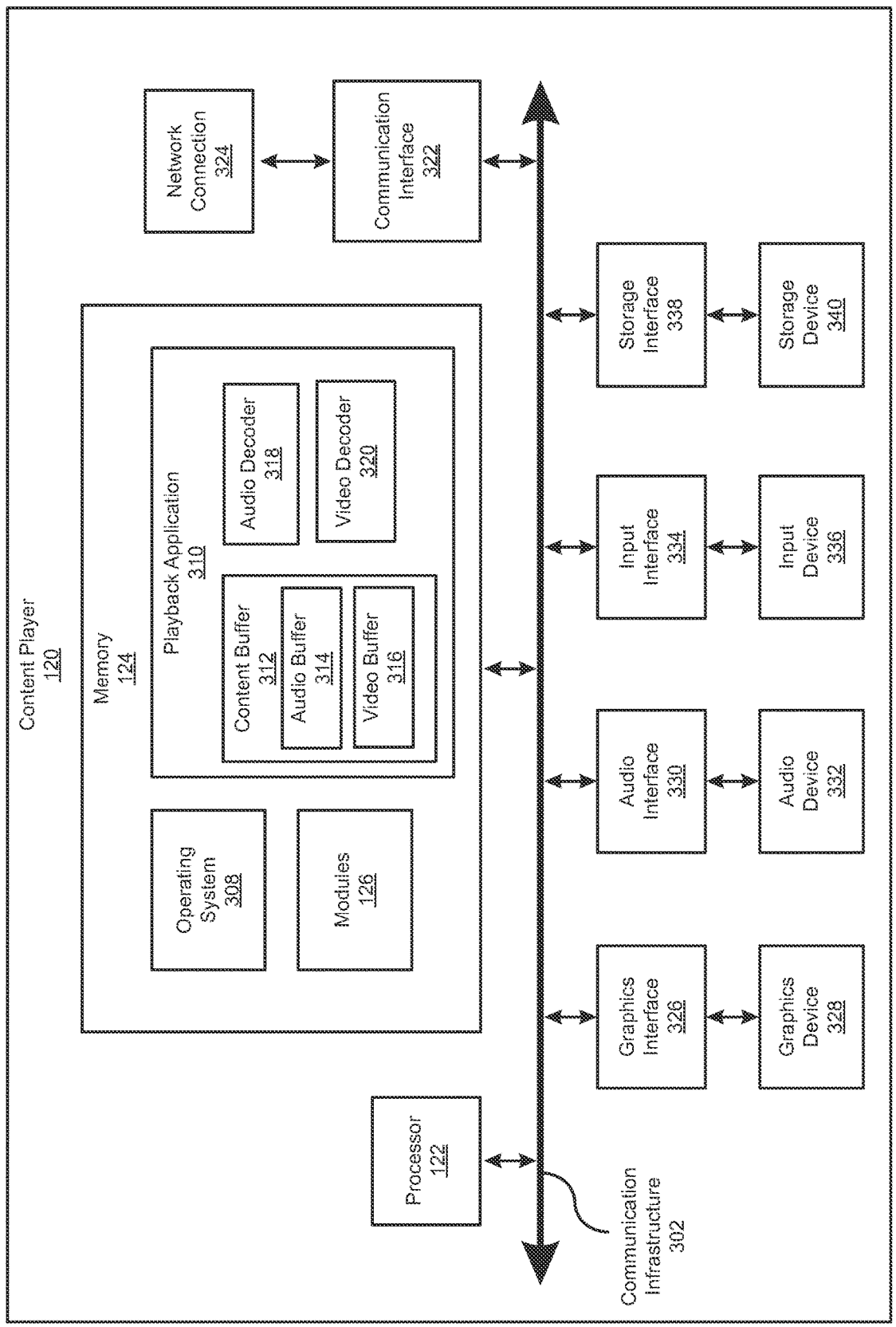
FIG. 3 is a block diagram of an exemplary content player within the content distribution ecosystem shown in FIG. 1.

Because many of the embodiments described herein may be used with substantially any type of video content or any type of video content provider or video streaming provider, FIGS. 1-3 will introduce the various ways in which video content may be provisioned to users and ultimately consumed by users. FIGS. 4-10 will describe more specific embodiments in which a video crop for a video scene may be automatically generated and applied to create a cropped version of a video scene.

FIG. 1 is a block diagram of a content distribution ecosystem 100 that includes a distribution infrastructure 110 in communication with a content player 120. In some embodiments, distribution infrastructure 110 may be configured to encode data and to transfer the encoded data to content player 120. Content player 120 may be configured to receive the encoded data via distribution infrastructure 110 and to decode the data for playback to a user. The data provided by distribution infrastructure 110 may include audio, video, text, images, animations, interactive content, haptic data, virtual or augmented reality data, location data, gaming data, or any other type of data that may be provided via streaming.

Distribution infrastructure 110 generally represents any services, hardware, software, or other infrastructure components configured to deliver content to end users. For example, distribution infrastructure 110 may include content aggregation systems, media transcoding and packaging services, network components, and/or a variety of other types of hardware and software. Distribution infrastructure 110 may be implemented as a highly complex distribution system, a single media server or device, or anything in between. In some examples, regardless of size or complexity, distribution infrastructure 110 may include at least one physical processor 112 and at least one memory device 114. One or more modules 116 may be stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 may include a physical processor 122, memory 124, and one or more modules 126. Some or all of the adaptive streaming processes described herein may be performed or enabled by modules 126, and in some examples, modules 116 of distribution infrastructure 110 may coordinate with modules 126 of content player 120 to provide adaptive streaming of multimedia content.

In certain embodiments, one or more of modules 116 and/or 126 in FIG. 1 may represent one or more software applications or programs that, when executed by a computing device, may cause the computing device to perform one or more tasks. For example, and as will be described in greater detail below, one or more of modules 116 and 126 may represent modules stored and configured to run on one or more general-purpose computing devices. One or more of modules 116 and 126 in FIG. 1 may also represent all or portions of one or more special-purpose computers configured to perform one or more tasks.

In addition, one or more of the modules, processes, algorithms, or steps described herein may transform data, physical devices, and/or representations of physical devices from one form to another. For example, one or more of the modules recited herein may receive defect identification data, transform the defect identification data by preparing the defect identification data for presentation in an interactive user interface, provide the result of the transformation to the interactive user interface, and render the transformed defect identification data on the interactive user interface. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 may access and/or modify one or more of modules 116 and 126, respectively. Additionally or alternatively, physical processors 112 and 122 may execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 may store, load, and/or maintain one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 may include storage 210, services 220, and a network 230. Storage 210 generally represents any device, set of devices, and/or systems capable of storing content for delivery to end users. Storage 210 may include a central repository with devices capable of storing terabytes or petabytes of data and/or may include distributed storage systems (e.g., appliances that mirror or cache content at Internet interconnect locations to provide faster access to the mirrored content within certain regions). Storage 210 may also be configured in any other suitable manner.

As shown, storage 210 may store, among other items, content 212, user data 214, and/or log data 216. Content 212 may include television shows, movies, video games, user-generated content, and/or any other suitable type or form of content. User data 214 may include personally identifiable information (PII), payment information, preference settings, language and accessibility settings, and/or any other information associated with a particular user or content player. Log data 216 may include viewing history information, network throughput information, and/or any other metrics associated with a user's connection to or interactions with distribution infrastructure 110.

Services 220 may include personalization services 222, transcoding services 224, and/or packaging services 226. Personalization services 222 may personalize recommendations, content streams, and/or other aspects of a user's experience with distribution infrastructure 110. Encoding services 224 may compress media at different bitrates which may enable real-time switching between different encodings. Packaging services 226 may package encoded video before deploying it to a delivery network, such as network 230, for streaming.

Network 230 generally represents any medium or architecture capable of facilitating communication or data transfer. Network 230 may facilitate communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 may include an Internet backbone 232, an internet service provider 234, and/or a local network 236.

FIG. 3 is a block diagram of an exemplary implementation of content player 120 of FIG. 1. Content player 120 generally represents any type or form of computing device capable of reading computer-executable instructions. Content player 120 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 may include a communication infrastructure 302 and a communication interface 322 coupled to a network connection 324. Content player 120 may also include a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 may store and/or load an operating system 308 for execution by processor 122. In one example, operating system 308 may include and/or represent software that manages computer hardware and software resources and/or provides common services to computer programs and/or applications on content player 120.

Operating system 308 may perform various system management functions, such as managing hardware components (e.g., graphics interface 326, audio interface 330, input interface 334, and/or storage interface 338). Operating system 308 may also process memory management models for playback application 310. The modules of playback application 310 may include, for example, a content buffer 312, an audio decoder 318, and a video decoder 320.

Playback application 310 may be configured to retrieve digital content via communication interface 322 and play the digital content through graphics interface 326. Graphics interface 326 may be configured to transmit a rendered video signal to graphics device 328. In normal operation, playback application 310 may receive a request from a user to play a specific title or specific content. Playback application 310 may then identify one or more encoded video and audio streams associated with the requested title. After playback application 310 has located the encoded streams associated with the requested title, playback application 310 may download sequence header indices associated with each encoded stream associated with the requested title from distribution infrastructure 110. A sequence header index associated with encoded content may include information related to the encoded sequence of data included in the encoded content.

In one embodiment, playback application 310 may begin downloading the content associated with the requested title by downloading sequence data encoded to the lowest audio and/or video playback bit rates to minimize startup time for playback. The requested digital content file may then be downloaded into content buffer 312, which may be configured to serve as a first-in, first-out queue. In one embodiment, each unit of downloaded data may include a unit of video data or a unit of audio data. As units of video data associated with the requested digital content file are downloaded to the content player 120, the units of video data may be pushed into the content buffer 312. Similarly, as units of audio data associated with the requested digital content file are downloaded to the content player 120, the units of audio data may be pushed into the content buffer 312. In one embodiment, the units of video data may be stored in video buffer 316 within content buffer 312 and the units of audio data may be stored in audio buffer 314 of content buffer 312.

A video decoder 320 may read units of video data from video buffer 316 and may output the units of video data in a sequence of video frames corresponding in duration to the fixed span of playback time. Reading a unit of video data from video buffer 316 may effectively de-queue the unit of video data from video buffer 316. The sequence of video frames may then be rendered by graphics interface 326 and transmitted to graphics device 328 to be displayed to a user.

An audio decoder 318 may read units of audio data from audio buffer 314 and output the units of audio data as a sequence of audio samples, generally synchronized in time with a sequence of decoded video frames. In one embodiment, the sequence of audio samples may be transmitted to audio interface 330, which may convert the sequence of audio samples into an electrical audio signal. The electrical audio signal may then be transmitted to a speaker of audio device 332, which may, in response, generate an acoustic output.

In situations where the bandwidth of distribution infrastructure 110 is limited and/or variable, playback application 310 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Graphics interface 326 may be configured to generate frames of video data and transmit the frames of video data to graphics device 328. In one embodiment, graphics interface 326 may be included as part of an integrated circuit, along with processor 122. Alternatively, graphics interface 326 may be configured as a hardware accelerator that is distinct from (i.e., is not integrated within) a chipset that includes processor 122.

Graphics interface 326 generally represents any type or form of device configured to forward images for display on graphics device 328. For example, graphics device 328 may be fabricated using liquid crystal display (LCD) technology, cathode-ray technology, and light-emitting diode (LED) display technology (either organic or inorganic). In some embodiments, graphics device 328 may also include a virtual reality display and/or an augmented reality display. Graphics device 328 may include any technically feasible means for generating an image for display. In other words, graphics device 328 generally represents any type or form of device capable of visually displaying information forwarded by graphics interface 326.

As illustrated in FIG. 3, content player 120 may also include at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 may also include a storage device 340 coupled to communication infrastructure 302 via a storage interface 338. Storage device 340 generally represent any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems may be included in or connected to content player 120. Conversely, one or more of the components and devices illustrated in FIG. 3 need not be present to practice the embodiments described and/or illustrated herein. The devices and subsystems referenced above may also be interconnected in different ways from that shown in FIG. 3. Content player 120 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program may be loaded into content player 120. All or a portion of the computer program stored on the computer-readable medium may then be stored in memory 124 and/or storage device 340. When executed by processor 122, a computer program loaded into memory 124 may cause processor 122 to perform and/or be a means for performing the functions of one or more of the example embodiments described and/or illustrated herein. Additionally or alternatively, one or more of the example embodiments described and/or illustrated herein may be implemented in firmware and/or hardware. For example, content player 120 may be configured as an Application Specific Integrated Circuit (ASIC) adapted to implement one or more of the example embodiments disclosed herein.

Figure 4:
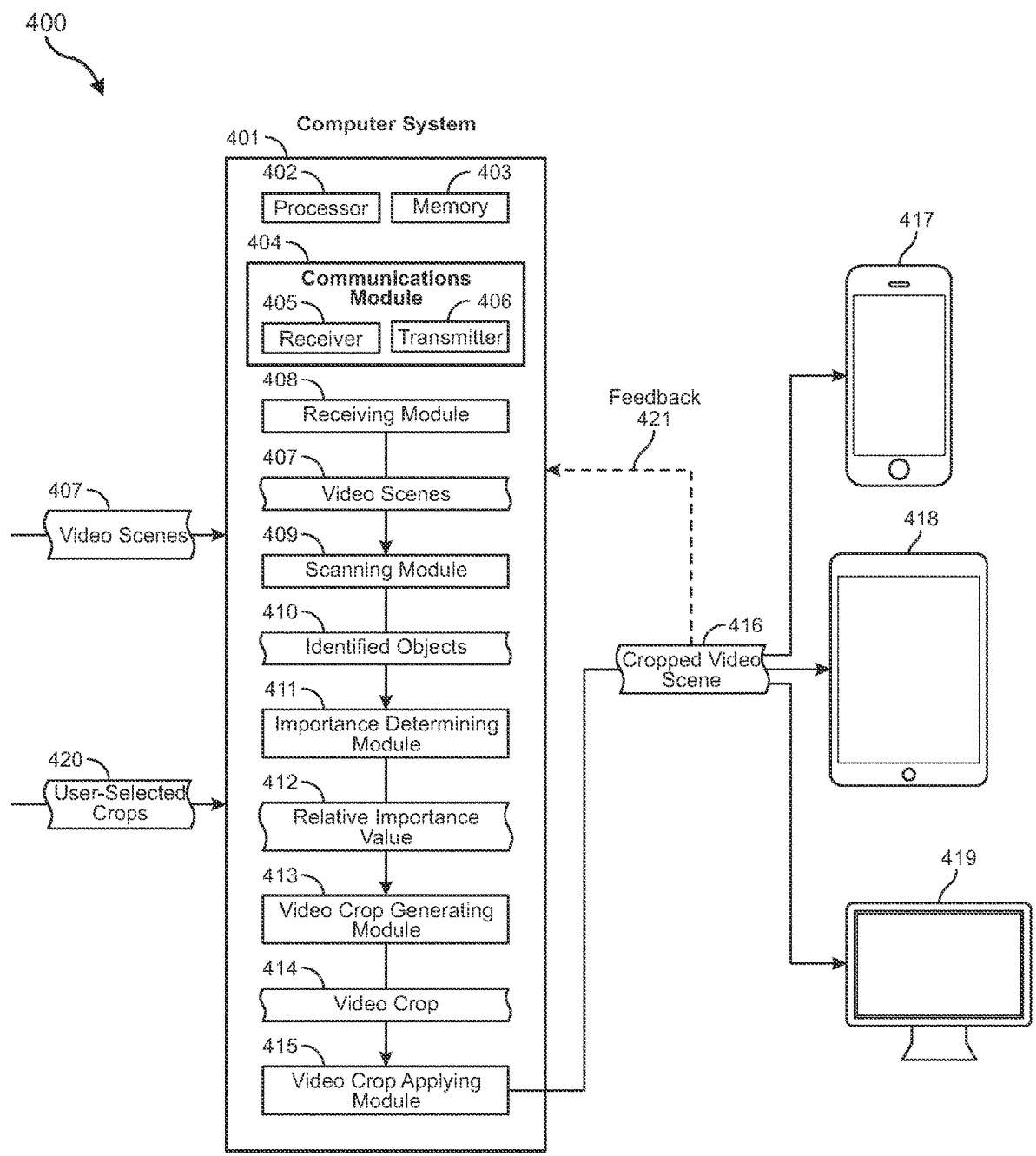
FIG. 4 illustrates a computing environment in which embodiments described herein may operate.

FIG. 4 illustrates a computing environment 400 that includes a computer system 401. The computer system 401 may be substantially any type of computer system including a local computer system or a distributed (e.g., cloud) computer system. The computer system 401 may include at least one processor 402 and at least some system memory 403. The computer system 401 may include program modules for performing a variety of different functions. The program modules may be hardware-based, software-based, or may include a combination of hardware and software. Each program module may use computing hardware and/or software to perform specified functions, including those described herein below.

For example, the communications module 404 may be configured to communicate with other computer systems. The communications module 404 may include any wired or wireless communication means that can receive and/or transmit data to or from other computer systems. These communication means may include hardware radios including, for example, a hardware-based receiver 405, a hardware-based transmitter 406, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded or other types of computing systems.

The computer system 401 may further include a receiving module 408. The receiving module 408 may be configured to receive various forms of data including video scenes 407, user-selected crops 420, and cropped video scenes 416, among other types of data. The receiving module 408 may pass some or all of this data to other modules in computer system 401 including to scanning module 409. The scanning module 409 may be configured to scan one or more of the video scenes 407 received by the receiving module 408. The video scenes may be part of a film or other portion of video content. In some cases, the video scenes 407 may include a collection of segmented video scenes that, together, make up a film. The segmented video scenes 407 may be divided up into discrete portions. These discrete portions may be of a fixed, specified length and may correspond to different portions of the movie. In some cases, these segmented video scenes may correspond to different camera takes. In other cases, the segmented video scenes may correspond to portions where a certain character or set of characters appears. In still other cases, the segmented video scenes may correspond to user-selected beginning and end positions in the film.

Regardless of how the movie, tv, or other video content is broken up, the resulting video scenes 407 may be scanned by the scanning module 409 for objects within the scene. Each scene in a movie may include one or more objects 410 including persons, animals, landscape features, cars, buildings, or any other of a wide variety of different objects that may be included in a portion of video content. The scanning module 407 may identify objects in a video scene using a variety of different techniques. For example, in some cases, the scanning module 409 may incorporate neural networks such as convolutional neural networks (CNNs) or other types of neural networks to perform object identification. In such cases, the neural networks may determine the semantic identity of the object (e.g., dog, tree, automobile, beach, etc.) or may simply identify the object as being a distinct object within the video scene and as potentially being the same object in other video scenes that occur earlier or later in the film or tv show.

The scanning module 409 may provide an indication of these identified objects 410 to the importance determining module 411. The importance determining module 411 may be configured to generate a relative importance value 412 for some or all of the identified objects 410. As noted above, the relative importance value 412 may be generated in a variety of ways and may indicate which of the identified objects 410 are important enough to be included in a cropped version of the video scene 407. For example, if a given video scene shot in 16:9 ratio is to be cropped to 1:1 ratio for a social media application, some of the content of the video scene will be lost during the cropping. The importance determining module 411 may be configured to determine, for each scene, which objects are of the highest relative importance relative to the other objects in the video scene. Then, when the video crop generating module 413 generates the video crop 414, the objects with the highest relative importance for that video scene 407 may be preserved in the cropped version of the video scene 416. These concepts will be described in greater detail below with regard to method 500 of FIG. 5.

Figure 5:
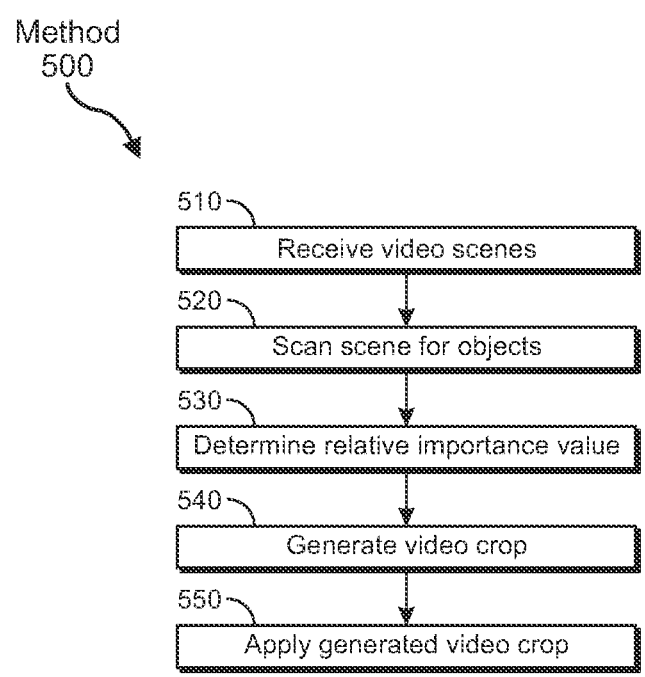
FIG. 5 is a flow diagram of an exemplary method generating and applying a video crop to a video scene.

FIG. 5 is a flow diagram of an example computer-implemented method 500 for generating and applying a video crop. The steps shown in FIG. 5 may be performed by any suitable computer-executable code and/or computing system, including distribution infrastructure 110 of FIG. 1, content player 120, computer system 401 of FIG. 4, or a combination thereof. In one example, each of the steps shown in FIG. 5 may represent an algorithm whose structure includes and/or is represented by multiple sub-steps, examples of which will be provided in greater detail below. The steps of FIG. 5 will be described below in conjunction with computer system 401 and other components of FIG. 4. The components of FIG. 4 may also be referred to when discussing the embodiments illustrated in FIGS. 6-10.

As illustrated in FIG. 5, at step 510, one or more of the systems or modules described herein may receive, as an input, segmented video scenes, where each video scene includes a specified length of video content. For example, in system 400 of FIG. 4, receiving module 408 may receive or otherwise access segmented video scenes 407. The segmented video scenes 407 may be received from another local or remote computer system or from another entity or user. In some cases, the segmented video scenes 407 may be accesses on a local or remote data store (e.g., a cloud-based data store). The segmented video scenes 407 may represent cinematic film shots. In such cinematic film shots, the subject of the shot may move but typically would not change significantly. As such, the segmented video scenes 407 may represent certain shots in a movie or tv show, or may represent certain time segments within the movie or tv show.

At step 520, the scanning module 409 of computer system 401 may scan the video scenes 407 to identify objects 410 within the video scenes. The objects may be identified using any of a variety of different object recognition algorithms.

For example, the scanning module 409 may implement various machine learning object detection approaches including scale-invariant feature transform (SIFT), histogram of oriented gradients (HOG), or the Viola-Jones object detection framework. Additionally or alternatively, the scanning module 409 may implement deep learning approaches including, for example, motion saliency (where regions of interest are detected according to the motion saliency of moving objects), region-based convolutional neural network (R-CNN), fast R-CNN, faster R-CNN, single shot multibox detector (SSD), you only look once (YOLO), or other deep learning algorithms. Any or all of these (or other) machine learning or deep learning approaches may be used to identify objects in a video scene. These object identification approaches may also identify the location of objects in a video scene and may count the number of instances of an object in a given scene. In some embodiments, these or similar algorithms may be used to classify objects within a video scene into semantic groups such as cats, dogs, humans, electronic devices, houses, trains, landscape features, etc.

Thus, the scanning module 409 may scan the duration of a given video scene 407 to determine which objects appear in that scene. The scanning module 409 may create a list of these objects, identify in which order the objects appear during the timeline of the video scene, identify how long each object appears in the scene, identify the position of each object within the scene and its position in relation to other objects within the scene, identify the frequency of occurrence of the objects during the timeline of the video, and/or identify other characteristics associated with the objects of the video scene 407.

At step 530 of FIG. 5, the importance determining module 411 may determine a relative importance value 412 for the identified objects 410. The relative importance value 412 may include an indication of which objects 410 are to be included in a cropped version of the video scene. The method 500 may also include, at step 540, generating a video crop 414 that is to be applied to the video scene 407. As such, the resulting cropped version of the video scene 416 may include those identified objects that are to be included based on the relative importance value. Then, at step 550, the video crop applying module 415 may apply the generated video crop 414 to the video scene 407 to produce the cropped version of the video scene 416.

As noted above, when determining the relative importance value 412 of each identified object in a scene, the importance determining module 411 may use various machine learning algorithms or different types of neural networks or other algorithms to determine the relative importance of the objects in a scene. For instance, the importance determining module 411 may implement a saliency model to determine a motion saliency value for objects identified in the video scene 407. This motion saliency value may indicate which objects are moving within the scene. In some cases, it may be desirable for a cropped version of a video scene to include objects that are moving, either within the frames or into or out of the frames of the scene. Moving objects often have a higher importance to a scene than stationary objects. Thus, a higher motion saliency value may indicate more motion and may thus be assigned a higher relative importance value 412 by the importance determining module 411, whereas a lower motion saliency value may indicate less motion and may thus be assigned a lower relative importance value.

Other factors used by the importance determining module 411 may include the semantic context or classification for an object. For instance, the scanning module 409 may be configured to identify the semantic context for the object such as a class of basketballs, trucks, water skis, mountains, or other object or class of objects. The importance determining module 411 may determine that, within the context of the video scene, that object or that type of object is more or less important than other objects in the scene. The importance determining module 411 may thus rank the identified objects on importance based on which type of object or class of objects they are. Thus, in some cases for example, objects such as humans or animals may take precedence over inanimate objects. Policies may govern which objects or which classes of objects take priority and receive a higher or lower importance value 412 in a given video scene. These policies may apply to many different films or pieces of video content or may be different for each film.

Another factor used by the importance determining module 411 may include the frequency of an object's appearance in the video scene or in a series of video scenes. For example, a person or group of people may appear in a certain scene. One or two of these people may appear more often that other people. In some cases, various machine learning methods such as unsupervised face clustering or object clustering may be used to identify the frequency of occurrence for a particular face or object. These persons or objects may be assigned a higher importance value relative to the other persons or objects. In addition to frequency of appearance, other methods may be used to identify persons or objects that are important to a given video scene. For example, face recognition or object recognition algorithms may be used to identify particular cast members (e.g., A-list movie stars) or particular objects (e.g., the "Millennium Falcon" from "Star Wars") in the video scene. These cast members or objects may be assigned a higher or lower importance based on who or what they are.

More "important" people or objects may be grouped together so that the group is more likely to appear in a cropped version of the video scene. When the video crop generating module 413 is determining how to generate a video crop 414 for a given scene, that module may use the relative importance value 412 for each object or group of objects to determine where the crop should be placed. If, for example, the cropped version of the video scene can be moved to the right or left relative to the original video scene in order to keep an object of higher importance in the frame, the video crop 414 may be generated in a manner so as to keep that object in the frame. These concepts will now be explained further with regard to FIGS. 6A-10.

Figure 6A:
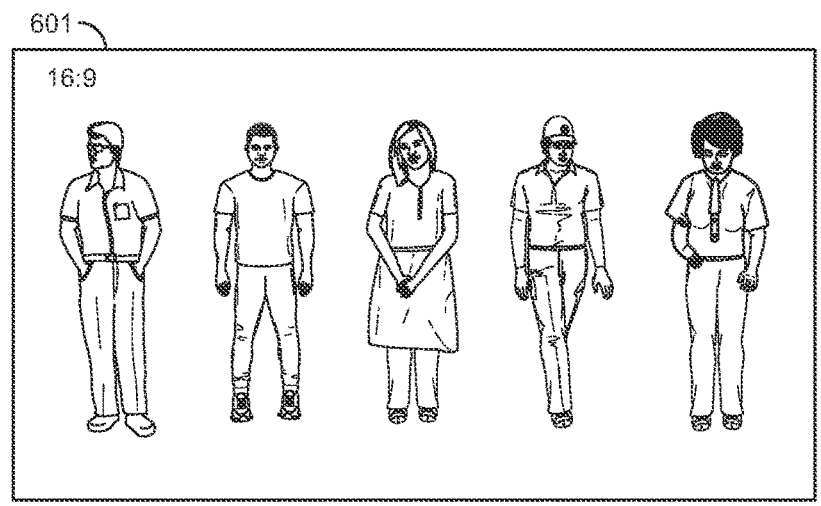
FIGS. 6A-6C illustrate embodiments of different video crop sizes for cropped video scenes.
Figure 6B:
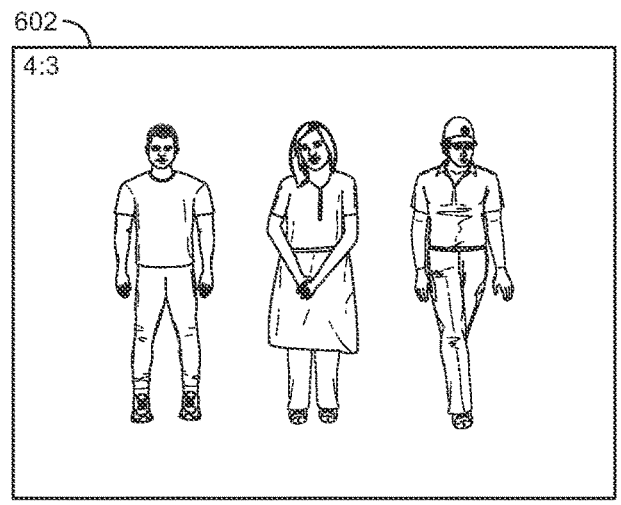

FIG. 6A illustrates an embodiment of a video crop 601 in a 16:9 ratio. In this video crop 601, five persons are visible. In another crop 602 of the same video scene in FIG. 6B, only three of the persons are shown. The 4:3 aspect ratio of 602 in FIG. 6B cannot include all of the content of the 16:9 version and, as such, the two persons on either end of the 16:9 ratio image of FIG. 6A are cropped out. Similarly, in FIG. 6C, the 1:1 image crop 603 has also cut off the persons on either end of the 16:9 image. It will be understood here that the video crop may be generated to include certain objects at the exclusion of others. Depending on the shape and the size of the video crop, certain elements and objects may be left in the cropped version and some may be cropped out.

Figure 7A:
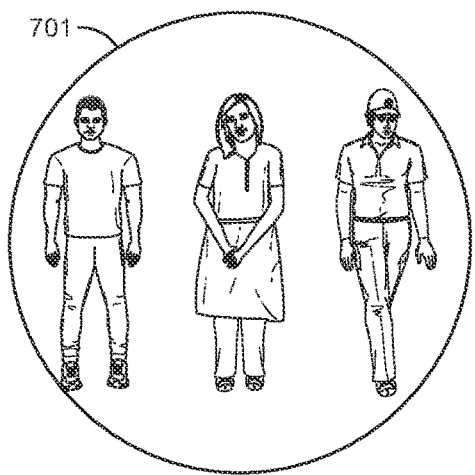
FIGS. 7A-7C illustrate embodiments of different video crop shapes for cropped video scenes.
Figure 7B:
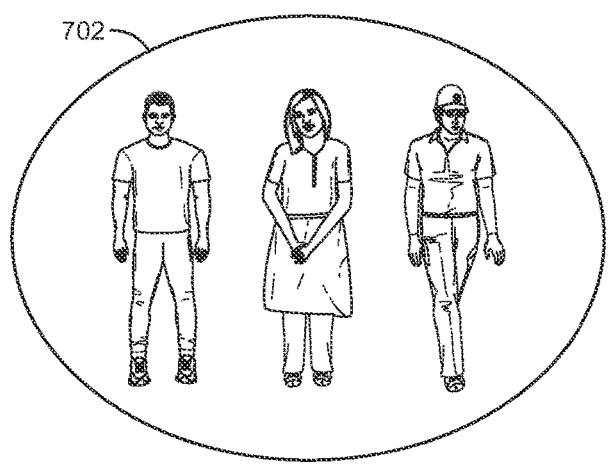
Figure 7C:
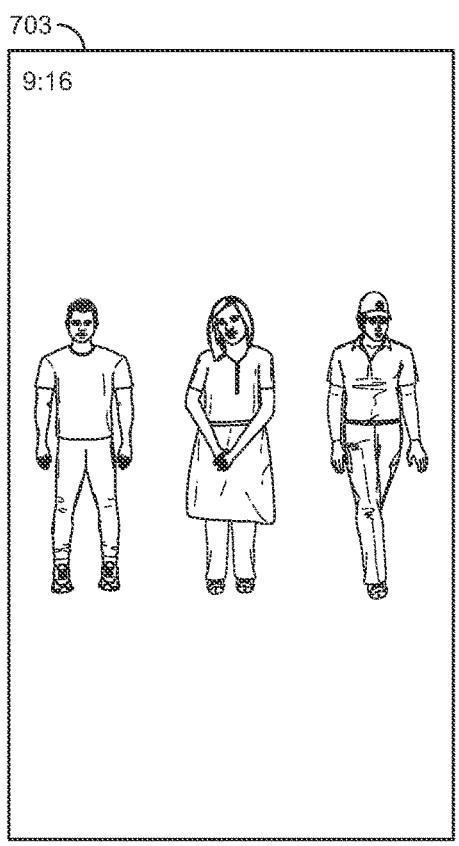
Figure 8:
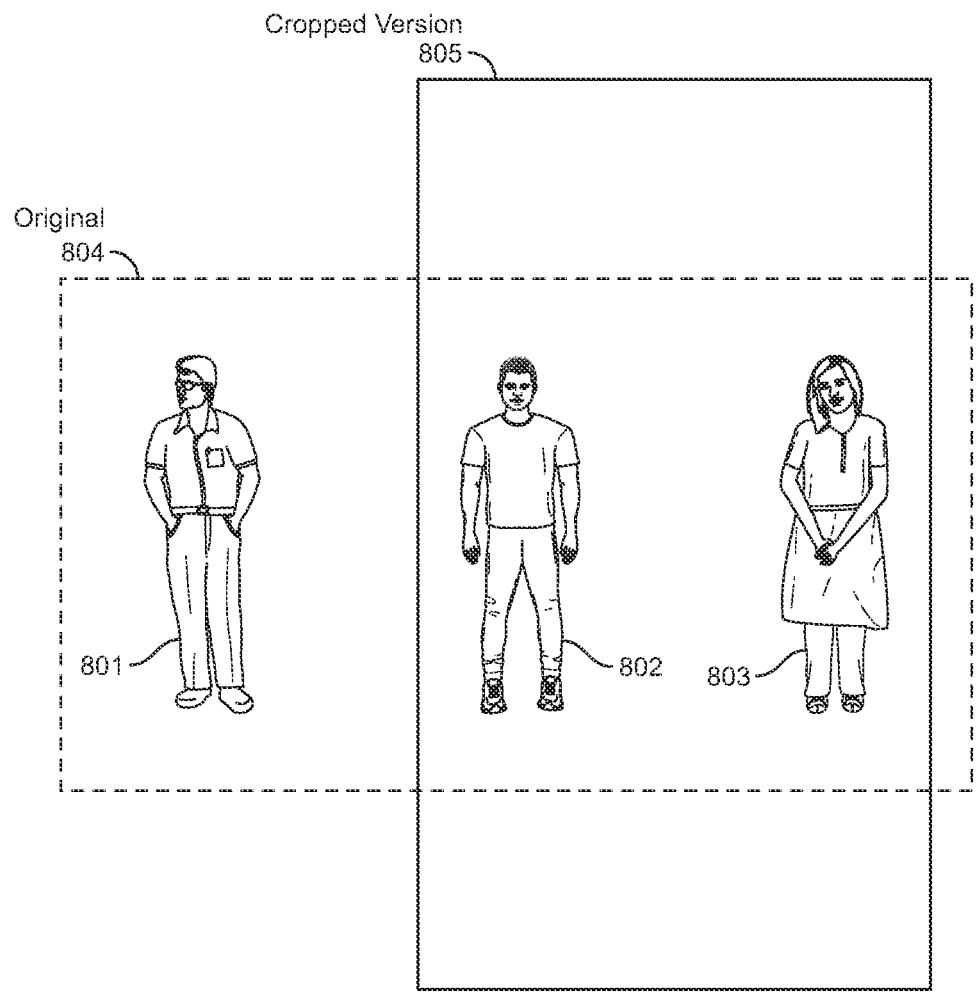
FIG. 8 illustrates an embodiment of an original video scene and a cropped version of the video scene.

FIGS. 7A-7C illustrate embodiments of differently-shaped crops. For example, FIG. 7A illustrates an embodiment of a circular crop 701. FIG. 7B illustrates an embodiment of an oval-shaped crop 702, and FIG. 7C illustrates an embodiment of a 9:16 rectangular crop 703. Each of these video crops has centered on three central characters. However, as shown in FIG. 8, some characters or other objects may be left out in the cropped version of a scene. For example, FIG. 8 illustrates an original video scene 804 shot in 16:9 aspect ratio. The original video scene 804 included three characters 801, 802, and 803. The cropped version 805 in FIG. 8 is a 9:16 rectangular crop similar to 703 of FIG. 7C. The cropped version 805 may be designed for viewing on smartphone or tablet in portrait mode.

As such, the cropped version would not be able to display all three characters 801-803 without drastically shrinking the image. Accordingly, some of the original video scene 804 is to be cropped. The importance determining module 411 of FIG. 4 may be implemented by computer system 401 to determine which identified objects 410 (e.g., characters 801-803) are to be included in the cropped version of the video scene 805. In some embodiments, the importance determining module 411 may look at which characters or objects are moving, or which characters are talking, or which characters have appeared in other video scenes and are thus more likely to be main characters. The importance determining module 411 may also look at which characters or objects are blurred in the scene and which are in focus, or which grouping of objects would fit within a given crop.

Figure 6C:
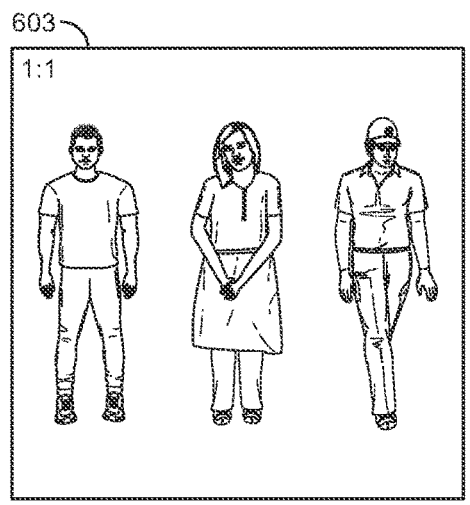

For example, the importance determining module 411 may look at which characters or objects would fit within circular crop 701 of FIG. 7A, or which characters would fit in a 1:1 crop 603 of FIG. 6C. The importance determining module 411 may thus look at the size and/or shape of the proposed cropped version and determine which objects could be included in that crop. In FIG. 8, the cropped version 805 may be shifted to the left, to the right, upwards or downwards, or may be put in any particular place relative to the original scene 804.

Figure 9:
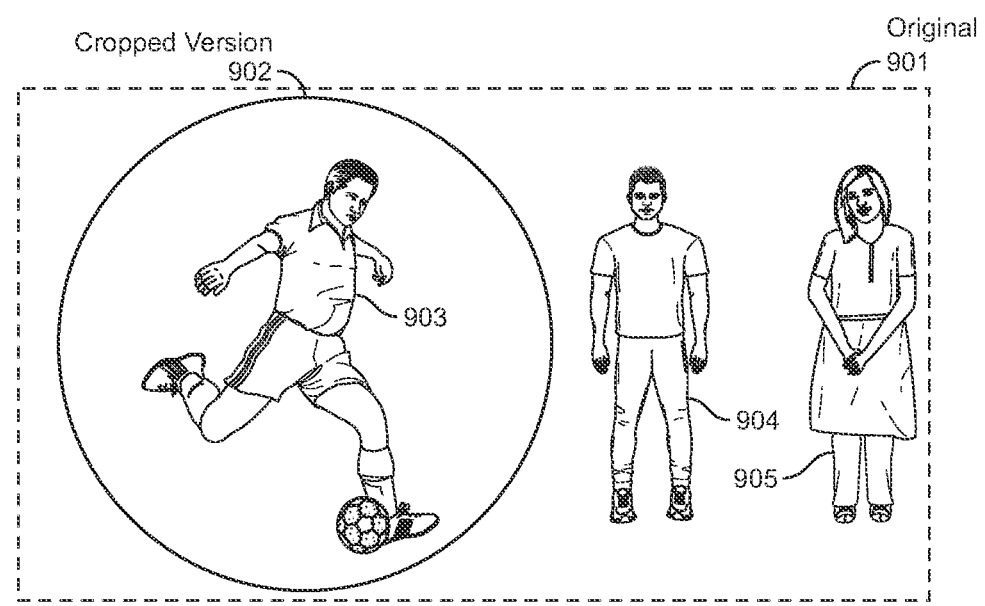
FIG. 9 illustrates an alternative embodiment of an original video scene and a cropped version of the video scene.

For instance, FIG. 9 illustrates an embodiment of a circular cropped version 902. The original video scene 901 was shot in 16:9 and is being cropped to a circular shape (as in FIG. 7A). This circle 902 may be moved to substantially any portion of the original 901, including over characters 904 and 905, or over character 903. The circle crop 902 could encompass all of character 903 (a soccer player), or both of characters 904 and 905, but not all of the characters 903-905. Thus, the importance determining module 411 may determine which objects (in this case, characters) are to be included in the circular crop for that scene. Once the importance determining module 411 has determined that the soccer player 903 has the highest relative importance value 412, the video crop generating module 413 may generate the appropriate circular video crop 414 that includes the soccer player 903. The video crop applying module 415 may then apply the crop 414 to generate the cropped scene 902. The cropped scene 416 may then be sent to one or more electronic devices including a smartphone 417, a tablet 418, a television or monitor 419, or to some other electronic device.

In some embodiments, the importance determining module 411 may implement the same algorithm to generate multiple different video crops. For example, once the objects 410 have been identified within a video scene 407 and these objects have been assigned a relative importance value 412, the video crop generating module 413 may generate circular video crops that include the most important objects 410, oval-shaped crops that include the most important objects, rectangular, square, portrait, landscape, or other differently sized or differently shaped video crops that include those objects that are most likely to want to be viewed by viewers of the scene. Indeed, the generated video crop may be of substantially any aspect ratio and of any shape desired by a user or editor. In some cases, the generated crop may specific to the size of a display screen (e.g., an airplane display screen, a smart phone display screen, a virtual reality display screen, etc.) or to the size of a video player (e.g., in a browser).

When the importance determining module 411 is analyzing the identified objects 410 to determine and assign an importance value to each object, the importance determining module may use the size of the display for the intended crop as a determining factor. Likewise, the importance determining module 411 may use the aspect ratio for the intended crop as a determining factor when determining and assigning an importance value 412 to each identified object 410. For larger displays or for more inclusive aspect ratios, the video crop generating module 413 may determine that more of the highly important objects may be included in certain scenes and, in smaller displays or in less inclusive aspect ratios, fewer of the objects with high relative importance values 412 may be included. In each scene, the video crop generating module 413 may be configured to generate a video crop 414 that includes the highest number of important objects 410 within the given size, aspect ratio, and other constraints. Thus, the video crop generating module 413 may optimize the video crop 414 for each video scene 407 within the confines of the crop shape, size, and aspect ratio.

In at least some embodiments, the systems herein may be configured to assess which objects in a scene the viewer is most likely to want to see, and then generate a video crop (within the noted constraints) that includes those objects. In some cases, multiple objects within the same video scene may have a sufficient relative importance value to merit inclusion in the resulting cropped version of the video scene. For instance, in FIG. 9, the importance determining module 411 may determine that the soccer player 903 and the soccer ball itself are of the highest importance in the scene. However, when the soccer player 903 kicks the soccer ball, in subsequent scenes, the soccer ball may have travelled some distance away from the soccer player 903. As such, the video crop generating module 413 may determine that a cropped version of the video scene would not have sufficient space to include both the soccer player 903 and the soccer ball (because the ball was too far away from the soccer player).

In such cases, the video crop generating module 413 may determine a prioritization value for the various objects (in this case, the soccer player 903 and the ball). The prioritization value may indicate, based on motion saliency (e.g., a measurement of the amount of movement of the object), frequency of appearance, blurring, or any of the other factors identified herein, that one object is more visually important than the other. The video crop generating module 413 may then apply the generated video crop 414 based on these prioritization values. As such, the object with the highest prioritization value and the highest importance value may be included in the cropped version of the video scene.

In some embodiments, the importance determining module 411 may implement a multi-pass analysis to determine the relative importance of each object. For example, in one pass, the importance determining module 411 may determine the frequency of appearance for a given object or group of objects. The next pass may measure the amount of motion for the object or group of objects. The next pass may measure the amount of blur associated with each object or group of objects, and so on. The importance determining module 411 may thus implement neural networks, machine learning, or other techniques that implement multiple passes to determine a relative importance value 412 for each object. Similarly, the video crop generating module 413 may determine a single crop shape for each pass or, in other cases, may determine multiple crop shapes during each pass. For example, the video crop generating module 413 may generate a video crop 414 for a circular crop shape, a rectangular crop shape, and a square crop shape in separate passes or all in the same pass. As such, at least in some cases, the same generated video crop may be used to crop the video scene into multiple different shapes or sizes.

Within the multi-pass analysis, the importance determining module 411 (or the scanning module 409) may determine a semantic context for the identified objects 410 in the video scene 407. For instance, the importance determining module 411 may determine the semantic content of the video scene, including determining whether the video scene includes people, animals, landscape features, or other features. The semantic content may be determined using a CNN as explained above. Knowing the semantic content of a scene may be useful in determining a relative importance value. In many cases, a human character will be more important than other identified objects and may receive a higher relative importance value 412. In other films, animals may receive a higher relative importance value, or a certain object or class of objects may receive higher values. Thus, the semantic context may be used as an additional factor (or as a sole factor) in determining and assigning a relative importance value 412 to an identified object 410.

Figure 10:
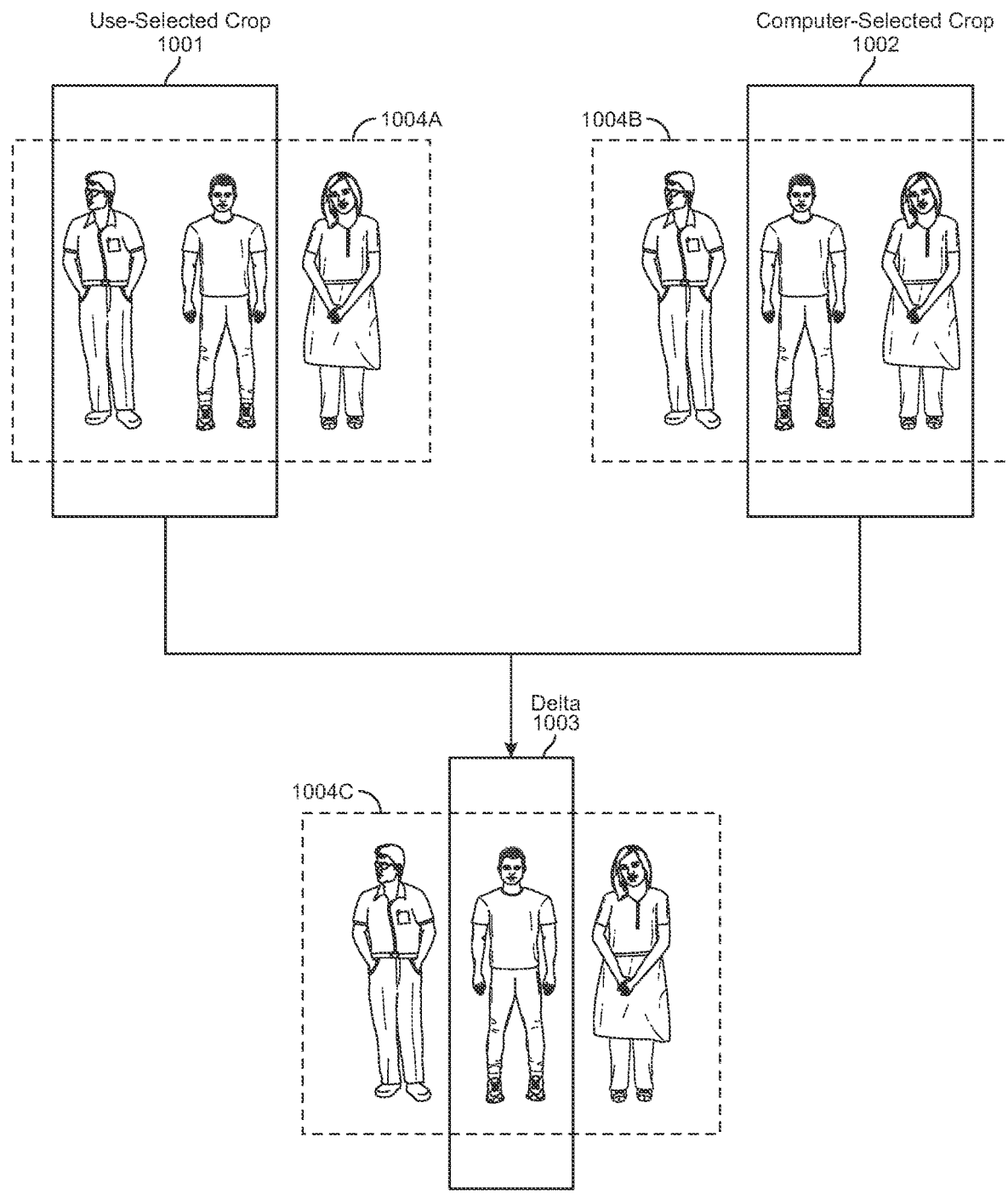
FIG. 10 illustrates an embodiment in which a user-selected video crop and a computer-selected video crop are compared and used for feedback.

In some embodiments, the computer system 401 may be configured to track which video crops 414 were generated and applied to the video scenes 407. Over time, this library of stored video crops may be used as feedback (421) for use in generating future video crops. For example, as shown in FIG. 10, the computer system 401 of FIG. 4 may be configured to compare a user-selected video crop 1001 to a computer-selected video crop 1002. In this example, both the user-selected crop 1001 and the computer-selected crop 1002 may begin with the same original film or video scene 1004A/1004B. In the case of the user-selected crop 1001, a user such as a video editor may select how to apply a rectangular, portrait crop to the original scene 1004A.

In the case of the computer-selected crop 1002, the computer system 401 may determine how to apply the same rectangular, portrait video crop to its instance of the original scene 1004B. The computer system 401 may then compare the user-selected crop 1001 and the computer-selected crop 1002 and identify a delta 1003 (i.e., the differences) between the crops and apply that delta to another instance of the original scene 1004C. Thus, the computer system 401 may analyze past user-selected video crops as well as computer-selected video crops and compare them to each other and to other user- or computer-selected video crops. By taking these actions, the computer system 401 may be self-learning and may improve over time to consistently select those objects that are most important to the viewer.

In some cases, the computer system 401 may be configured to automatically alter how a video crop is generated based on the identified differences in cropping. For example, in FIG. 10, if the computer system determines that the user-selected crop 1001 has selected a more optimal set of objects in its video crop, the computer system may alter the computer-selected crop to mimic the user-selected video crop. Similarly, if the computer system reviews similar previous video crops from a bank of stored video crops and determines that a previously-generated video crop is better (e.g., more accurately includes the objects the viewer desires to see), the computer system may alter the computer-selected crop 1002 to mimic a previously-generated video crop.

Thus, the scanning module 409, the importance determining module 411, the video crop generating module, and the video crop applying module 415 may each be or may implement self-learning, unsupervised models that improve over time. The feedback 421 from user-selected video crops or previously-generated video crops may be used as a benchmark for currently-generated video crops. Then, if the currently-generated video crops are below the benchmark (or are below a specified threshold), the currently-generated video crops may be altered to more accurately capture the most important objects in the video scene.

The video crops generated by the video crop generating module 413 may be of substantially any duration. For instance, the video crops 414 may be generated for and applied to a single frame of a scene, to multiple frames of a scene, to the entire scene, to a group of scenes, or to an entire film of substantially any length. In some embodiments, the same video crop 414 is applied to the same shot so that continuity is maintained within the shot. When generating and applying the various video crops, each scene may be processed by a different computing instance. For instance, in order to process a movie at a faster rate, the movie may be divided into different segmented video scenes. Each video scene may be sent to a different computing instance. Each computing instance may be preloaded with a machine learning or deep learning model that is configured to process the scene. These computing instances may also be configured to encode the cropped version of the video scene according to a specified encoding format that is specific to the scene or to the entire film.

In addition to the above disclosure, a corresponding system may be provided for automatically cropping a video scene. The system may include at least one physical processor and physical memory comprising computer-executable instructions that, when executed by the physical processor, cause the physical processor to: receive, as an input, various segmented video scenes, where each video scene includes a specified length of video content. The physical processor may scan at least one of the video scenes to identify objects within the video scene and determine a relative importance value for the identified objects within the video scene. The relative importance value may include an indication of which of the identified objects are to be included in a cropped version of the video scene. The physical processor may also generate, based on the determination, a video crop that is to be applied to the video scene, such that the resulting cropped version of the video scene includes those identified objects that are to be included according to the relative importance value. The physical processor may further apply the generated video crop to the video scene to produce the cropped version of the video scene.

In some examples, the above-described method may be encoded as computer-readable instructions on a computer-readable medium. For example, a computer-readable medium may include one or more computer-executable instructions that, when executed by at least one processor of a computing device, may cause the computing device to receive, as an input, various segmented video scenes, where each video scene includes a specified length of video content, scan at least one of the video scenes to identify objects within the video scene and determine a relative importance value for the identified objects within the video scene, where the relative importance value may include an indication of which of the identified objects are to be included in a cropped version of the video scene, generate, based on the determination, a video crop that is to be applied to the video scene, such that the resulting cropped version of the video scene includes those identified objects that are to be included according to the relative importance value, and apply the generated video crop to the video scene to produce the cropped version of the video scene.

Accordingly, systems and methods may be provided for automatically generating and applying a video crop to a piece of video content. The video crop may take into consideration the various objects that are depicted in any given video scene, including considerations such as whether the objects are moving, what type of objects they are, how frequently those objects appear in the video content, how blurry those objects are, etc. Based on this information and based on the size and shape to which the video content is to be cropped, the systems and methods may automatically generate the video crop and apply it to the video content. Feedback systems may also be put into place that allow the video cropping system to evaluate a video crop against other user-selected and computer-generated crops and improve the performance and accuracy of the system. In this manner, regardless of the size to which a piece of video content is to be cropped, it may include those objects which a viewer is interested in seeing.

Example Embodiments

1. A computer-implemented method comprising: receiving, as an input, one or more segmented video scenes, each video scene comprising a specified length of video content; scanning at least one of the video scenes to identify one or more objects within the video scene; determining a relative importance value for one or more of the identified objects within the video scene, the relative importance value comprising an indication of which of the one or more identified objects are to be included in a cropped version of the video scene; based on the determination, generating a video crop that is to be applied to the video scene, such that the resulting cropped version of the video scene includes those identified objects that are to be included according to the relative importance value; and applying the generated video crop to the video scene to produce the cropped version of the video scene.

2. The computer-implemented method of claim 1, wherein the generated video crop is configured to generate a plurality of different aspect ratios for the cropped version of the video scene.

3. The computer-implemented method of claim 1, wherein the generated video crop is configured to generate a plurality of different shapes for the cropped version of the video scene.

4. The computer-implemented method of claim 1, wherein the generated crop is specific to a size of a display screen.

5. The computer-implemented method of claim 4, wherein determining a relative importance value for one or more of the identified objects within the video scene includes, as a determining factor, the size of the display screen.

6. The computer-implemented method of claim 1, wherein determining a relative importance value for one or more of the identified objects within the video scene includes determining which of the one or more identified objects a viewer is most likely to want to see.

7. The computer-implemented method of claim 1, wherein determining a relative importance value for one or more of the identified objects within the video scene includes determining which of the one or more identified objects are to be included in a specific aspect ratio.

8. The computer-implemented method of claim 7, further comprising: determining that at least two objects in the video scene have a sufficient relative importance value to be included in the resulting cropped version of the video scene; determining that the cropped version of the video scene has insufficient space to include each of the at least two objects; determining prioritization values for the at least two objects; and applying the generated video crop based on the prioritization values, such that the object with the highest prioritization value is included in the cropped version of the video scene.

9. The computer-implemented method of claim 1, wherein determining a relative importance value for one or more of the identified objects within the video scene includes determining a frequency of occurrence of the one or more identified objects within the video scene.

10. The computer-implemented method of claim 1, wherein determining a relative importance value for one or more of the identified objects within the video scene includes measuring an amount of movement of the one or more identified objects within the video scene.

11. The computer-implemented method of claim 1, wherein determining a relative importance value for one or more of the identified objects within the video scene includes measuring an amount of blurring associated with each of the one or more identified objects in the video scene.

12. A system comprising: at least one physical processor; and physical memory comprising computer-executable instructions that, when executed by the physical processor, cause the physical processor to receive, as an input, one or more segmented video scenes, each video scene comprising a specified length of video content; scan at least one of the video scenes to identify one or more objects within the video scene; determine a relative importance value for one or more of the identified objects within the video scene, the relative importance value comprising an indication of which of the one or more identified objects are to be included in a cropped version of the video scene; based on the determination, generate a video crop that is to be applied to the video scene, such that the resulting cropped version of the video scene includes those identified objects that are to be included according to the relative importance value; and apply the generated video crop to the video scene to produce the cropped version of the video scene.

13. The system of claim 12, wherein the same generated video crop is used to crop the video scene into a plurality of different shapes or sizes.

14. The system of claim 12, further comprising determining a semantic context for one or more of the identified objects in the video scene.

15. The system of claim 14, wherein the determined semantic context is implemented when determining the relative importance value for the one or more identified objects in the video scene.

16. The system of claim 12, further comprising tracking which video crops were generated and applied to one or more of the video scenes.

17. The system of claim 16, further comprising comparing at least one cropped version of the video scene to a user-cropped version of the same video scene to identify one or more differences in cropping.

18. The system of claim 17, wherein the physical processor automatically alters how the video crop is generated based on the identified differences in cropping.

19. The system of claim 12, further comprising encoding the cropped version of the video scene according to a specified encoding format.

20. A non-transitory computer-readable medium comprising one or more computer-executable instructions that, when executed by at least one processor of a computing device, cause the computing device to: receive, as an input, one or more segmented video scenes, each video scene comprising a specified length of video content; scan at least one of the video scenes to identify one or more objects within the video scene; determine a relative importance value for one or more of the identified objects within the video scene, the relative importance value comprising an indication of which of the one or more identified objects are to be included in a cropped version of the video scene; based on the determination, generate a video crop that is to be applied to the video scene, such that the resulting cropped version of the video scene includes those identified objects that are to be included according to the relative importance value; and apply the generated video crop to the video scene to produce the cropped version of the video scene.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to generate a video crop, use the result of the transformation to crop a video, and store the result of the transformation to provide the cropped video. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method comprising:
    identifying one or more objects within a video scene;
    determining an importance value for one or more of the identified objects based on one or more importance factors;
    generating a video crop that will include a maximum number of identified objects that are determined to be valuable according to the established importance value; and
    applying the generated video crop to the video scene.

2. The computer-implemented method of claim 1, wherein at least one of the importance factors includes an indication that the identified object is an animate object.

3. The computer-implemented method of claim 2, wherein the animate object is a human being.

4. The computer-implemented method of claim 1, wherein at least one of the importance factors includes an indication that the identified object is moving.

5. The computer-implemented method of claim 1, wherein at least one of the importance factors includes an indication that the identified object has appeared multiple times throughout the video scene.

6. The computer-implemented method of claim 1, at least one of the importance factors includes an indication that the identified object is a specified individual.

7. The computer-implemented method of claim 6, wherein the specified individual is identified using facial recognition.

8. The computer-implemented method of claim 1, wherein at least one of the importance factors includes an indication of what the identified object is.

9. The computer-implemented method of claim 1, wherein at least one of the importance factors includes an indication that the identified object is talking.

10. The computer-implemented method of claim 1, wherein at least one of the importance factors includes an indication that the identified object has appeared in previous video scenes.

11. The computer-implemented method of claim 1, wherein the generated crop includes one of a plurality of different potential shapes.

12. The computer-implemented method of claim 1, wherein the generated crop is designed for one of a plurality of different display screen sizes.

13. A system comprising:
    at least one physical processor; and
    physical memory comprising computer-executable instructions that, when executed by the physical processor, cause the physical processor to:
    identify one or more objects within a video scene;
    determine an importance value for one or more of the identified objects based on one or more importance factors;
    generate a video crop that will include a maximum number of identified objects that are determined to be valuable according to the established importance value; and
    apply the generated video crop to the video scene.

14. The system of claim 13, further comprising determining a semantic context for one or more of the identified objects in the video scene.

15. The system of claim 14, wherein the determined semantic context is implemented when determining the importance value for the one or more identified objects in the video scene.

16. The system of claim 13, further comprising tracking which video crops were generated and applied to one or more of the video scenes.

17. The system of claim 16, further comprising comparing at least one cropped version of the video scene to a user-cropped version of the same video scene to identify one or more differences in cropping.

18. The system of claim 17, wherein the at least one physical processor automatically alters how the video crop is generated based on the identified differences in cropping.

19. The system of claim 13, further comprising encoding the cropped version of the video scene according to a specified encoding format.

20. A non-transitory computer-readable medium comprising one or more computer-executable instructions that, when executed by at least one processor of a computing device, cause the computing device to:
  identify one or more objects within a video scene;
  determine an importance value for one or more of the identified objects based on one or more importance factors;
  generate a video crop that will include a maximum number of identified objects that are determined to be valuable according to the established importance value; and
  apply the generated video crop to the video scene.

\* \* \* \* \*